(12) United States Patent
Scahill

(10) Patent No.: US 9,479,997 B2
(45) Date of Patent: Oct. 25, 2016

(54) WIRELESS ACCESS POINT

(71) Applicant: BRITISH TELECOMMUNICATIONS PUBLIC LIMITED COMPANY, London (GB)

(72) Inventor: Francis James Scahill, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/430,577

(22) PCT Filed: Sep. 24, 2013

(86) PCT No.: PCT/GB2013/000400
§ 371 (c)(1),
(2) Date: Mar. 24, 2015

(87) PCT Pub. No.: WO2014/045004
PCT Pub. Date: Mar. 27, 2014

(65) Prior Publication Data
US 2015/0245278 A1   Aug. 27, 2015

(30) Foreign Application Priority Data

Sep. 24, 2012   (GB) .................................. 1216999.1

(51) Int. Cl.
| H04W 48/02 | (2009.01) |
| H04W 76/02 | (2009.01) |
| H04W 12/08 | (2009.01) |
| H04L 29/06 | (2006.01) |
| H04W 8/20 | (2009.01) |
| H04W 8/26 | (2009.01) |

(Continued)

(52) U.S. Cl.
CPC ............ *H04W 48/02* (2013.01); *H04L 63/101* (2013.01); *H04W 12/08* (2013.01); *H04W 76/021* (2013.01); *H04W 8/20* (2013.01); *H04W 8/26* (2013.01); *H04W 84/02* (2013.01); *H04W 88/08* (2013.01)

(58) Field of Classification Search
CPC . H04W 76/021; H04W 48/02; H04W 12/08; H04W 84/02; H04W 88/08; H04W 8/20; H04W 8/26; H04L 63/101
See application file for complete search history.

(56) References Cited

U.S. PATENT DOCUMENTS 7,535,880 B1 * 5/2009 Hinman ................ H04W 12/08
370/338
8,931,067 B2 * 1/2015 Haddad ........................ 380/270

(Continued)

FOREIGN PATENT DOCUMENTS

CN     101420759     4/2009

OTHER PUBLICATIONS

International Search Report for PCT/GB2013/000400 mailed Jan. 16, 2014, 2 pages.

(Continued)

*Primary Examiner* — Brian D Nguyen
(74) *Attorney, Agent, or Firm* — Nixon & Vanderhye PC

(57) ABSTRACT

A wireless access point (100) which comprises a private device list (140), a private BSS and a public BSS. When a mobile terminal (400) connects to the private BSS (120) a unique identifier (such as a MAC address) is stored in the private device list. Any device whose unique identifier is stored in the private device list is prevented from subsequently connecting to the public BSS (130).

19 Claims, 4 Drawing Sheets

(51) Int. Cl.
*H04W 84/02* (2009.01)
*H04W 88/08* (2009.01)

(56) References Cited

U.S. PATENT DOCUMENTS

| | | |
|---|---|---|
| 2005/0147073 A1 | 7/2005 | Hietalahti et al. |
| 2005/0197136 A1* | 9/2005 | Friday ................ H04W 64/00 455/456.1 |
| 2007/0022055 A1* | 1/2007 | Eliason ................ G06F 21/10 705/51 |
| 2007/0243888 A1* | 10/2007 | Faccin ................ H04W 48/14 455/461 |
| 2009/0129301 A1 | 5/2009 | Belimpasakis |
| 2009/0190596 A1* | 7/2009 | Godlewski ............ H04W 8/087 370/395.31 |
| 2010/0232337 A1* | 9/2010 | Das ........................ H04W 4/12 370/312 |
| 2012/0047269 A1* | 2/2012 | Leonov ................ H04W 4/021 709/227 |
| 2012/0230305 A1* | 9/2012 | Barbu ................... H04W 48/20 370/338 |
| 2012/0236716 A1* | 9/2012 | Anbazhagan ....... H04L 41/5022 370/235 |

OTHER PUBLICATIONS

Office Action dated Jun. 7, 2016 issued in corresponding Chinese application No. 201380061409.8 with an at least partial English-language translation (13 pgs.).

* cited by examiner

WIRELESS ACCESS POINT

This application is the U.S. national phase of International Application No. PCT/GB2013/000400, filed 24 Sep. 2013, which designated the U.S. and claims priority to GB 1216999.1 filed 24 Sep. 2012, the entire contents of each of which are hereby incorporated by reference.

The present invention relates to a wireless access point and in particular to a wireless access point which can selectively allow connections.

BACKGROUND AND SUMMARY

It is common for communications network operators to provide WiFi access to the internet to their customers, such that users of smartphones, tablets and similar devices can access the internet. Currently, the applicant operates a WiFi network which has 4 million hotspots in the UK and 2 million more elsewhere in the world. A number of these hotspots are provided by domestic and commercial broadband wireless routers which advertise both a private SSID connected to the customers home network and a public SSID which is connected via a WiFi core network to the internet. A user may connect to a public SSID at a variety of premium sites e.g. hotels, cafes etc. as well as to the public SSID of a home or business router.

Unfortunately smartphones and tablets such as, for example iOS or Android devices, have an SSID prioritisation algorithm which prefers the last successfully connected SSID. This means that a user who connects to a public SSID when out of their home will by default automatically connect to the public side of their own access point when they return home. This is undesirable since it means they cannot access devices which are connected to their private network e.g. a Network Attached Storage device, or media players. It is also undesirable since it means that internet traffic that should be going straight to the internet via the broadband access network is instead being routed to the WiFi core network and thereby introducing additional costs to the network operator and potentially reduced throughput and thus decreased user experience.

Some third party connection manager applications, including for example the applicant's WiFi Android application, attempt to override the default behaviour of the devices and apply a private vs. public prioritisation programmatically on the device. This has proven to be difficult since many devices do not provide the appropriate APIs and even for those devices that do provide the necessary API access then there is a race condition between the underlying OS applying one prioritisation policy and the third party connection manager attempting to apply a different policy. In many cases the underlying OS wins this race and the incorrect prioritisation is applied.

U.S. Pat. No. 7,535,880 discloses a wireless access point which determines a unique identifier, such as a MAC address or an OUI (Organisational unique identifier) of a mobile terminal and uses that unique identifier to determine an access policy which controls the network connectivity and/or services which the mobile terminal is able to access.

According to a first aspect of the present invention there is provided a wireless access point comprising: a wireless network interface, a private device list and a connection to one or more communication networks; the wireless access point being configured, in use, to i) transmit a first identity and a second identity over the wireless network interface; ii) store a unique identifier of a mobile terminal in the private device list in response to the mobile terminal making a connection to the wireless access point via the first identity; iii) subsequently prevent a mobile terminal for which an associated unique identifier is stored in the private device list from connecting to the wireless access point via the second identity.

The wireless access point may be configured to store the media access control (MAC) address of the mobile terminal in the private device list in response to the mobile terminal making a connection to the wireless access point via the first identity. The first identity may comprise a private basic service set. The second identity may comprise a public basic service set.

According to a second aspect of the present invention there is provided a method of operating a wireless access point, the method comprising the steps of: a) transmitting a first identity and a second identity via a wireless network interface; b) storing a unique identifier of a mobile terminal in the private device list in response to the mobile terminal making a connection to the wireless access point via the first identity; and c) subsequently preventing a mobile terminal for which an associated unique identifier is stored in the private device list from connecting to the wireless access point via the second identity.

According to a third aspect of the present invention there is provided a tangible data carrier for use in a computing device, the data carrier comprising computer executable code which, in use, performs a method as described above.

BRIEF DESCRIPTION OF THE DRAWINGS

Embodiments of the present invention will now be described, by way of example only, with reference to the accompanying drawings in which.

DETAILED DESCRIPTION OF PRESENT EXAMPLE EMBODIMENTS

Figure 1:
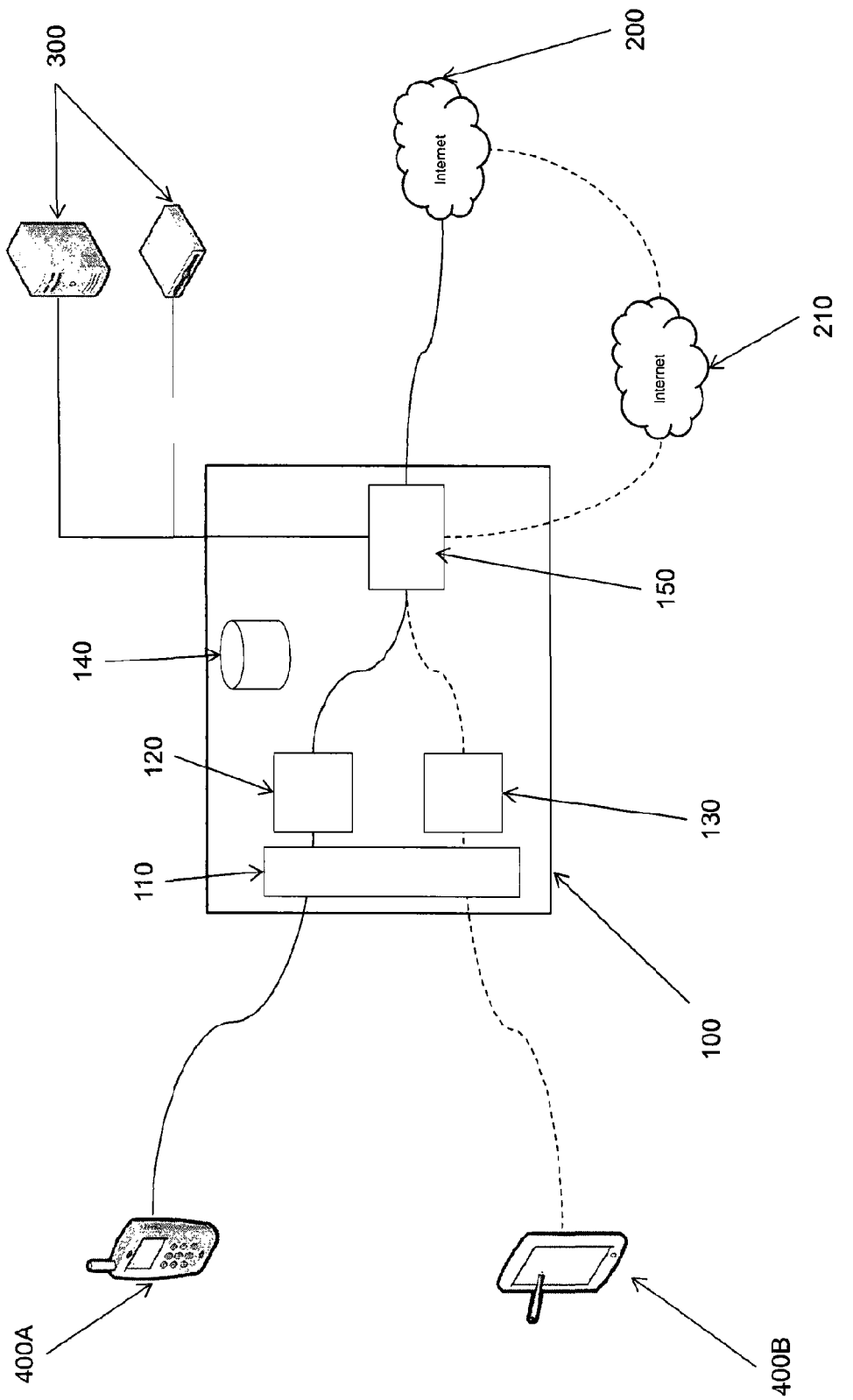
FIG. 1 shows a schematic depiction of a wireless access point 100 according to the present invention.

FIG. 1 shows a schematic depiction of a wireless access point 100 according to the present invention. The wireless access point 100 comprises wireless interface 110, private basic service set (BSS) 120, public basic service set (BSS) 130, private device list 140 and router 150. The router is connected to the internet 200 and one or more further devices 300, such as a NAS or media server, may be connected to the access point 100 via a wired Ethernet connection. Both the private and the public BSSs 120, 130 are implemented as virtual BSSs which both use the wireless interface. The private and the public BSSs have a different SSID so that users are aware of the connection that they are making to the wireless access point, for example BTHome-Hub for the private BSS and BTWiFi for the public BSS.

Mobile terminal 400A initiates a connection to the private BSS, for example, by the user selecting the SSID and entering the appropriate password or by using the WPS (Wi-Fi Protected Setup) method. To secure the connection, a suitable authentication method is used, for example WPA2 Pre-shared Key. Once mobile terminal 400A has made a connection to the wireless access point then the mobile terminal is able to send data to, and receive data from, the internet 200 (indicated by the solid line connecting the router 150 to the internet 200) and is also able to communicate with the one or more devices 300 connected to the access point via either a wired connection or a wireless connection to the private BSS. Furthermore, a unique identifier of the mobile terminal, such as, for example, the MAC (Media Access Control) address is stored by the wireless access point in the private device list 140. It is preferred to use the MAC address as the unique terminal identifier as it can be extracted automatically from the sender address field of the WiFi packets sent by the mobile terminal during the authentication process. The private device list may be stored in non-volatile memory so that the data persists between restarts of the access point. If a mobile terminal were to fail an authentication attempt then its MAC address may be removed from the private device list if it is already present.

If the mobile terminal 400A were to move out of range of the wireless access point 100 then the connection would be terminated. Subsequently, if the mobile terminal 400A were to move into range of a further access point which was advertising the BTWiFi public BSS then it would be possible for the mobile terminal 400A to make a connection to that further access point using the BTWiFi public BSS. When the mobile terminal returned back in range of the wireless access point 100 according to the present invention then the inclusion of the mobile terminal's MAC address in the private device list means that the wireless access point will not respond to any messages sent by the mobile terminal. Thus, the mobile terminal is not able to make a connection to the BTWiFi public BSS so that a connection can only be made to the BTHomeHub private BSS.

Mobile terminal 400B does not have its MAC address stored in the private device list and thus when it comes within range of the wireless access point 100 both the BTWiFi public BSS and the BTHomeHub private BSS will be presented to the terminal. As the user of the terminal does not have the necessary credentials to connect to the BTHomeHub private BSS then the mobile terminal 400B will connect to the BTWiFi public BSS. Traffic to the public BSS is encapsulated in a secure tunnel and forwarded via the router 150 to a network 210 operated by the WiFi provider (shown by a dashed line in FIG. 1). The mobile terminal may then be allowed to access the internet 200 although it may be necessary for the mobile terminal to undergo an authentication process operated within network 210 or to purchase access to the internet. Traffic which is sent to and from the BTWiFi public BSS is not able to access the devices attached to the access point via the wired LAN or any terminals which have a wireless connection to the BTHomeHub private BSS.

Figure 2:
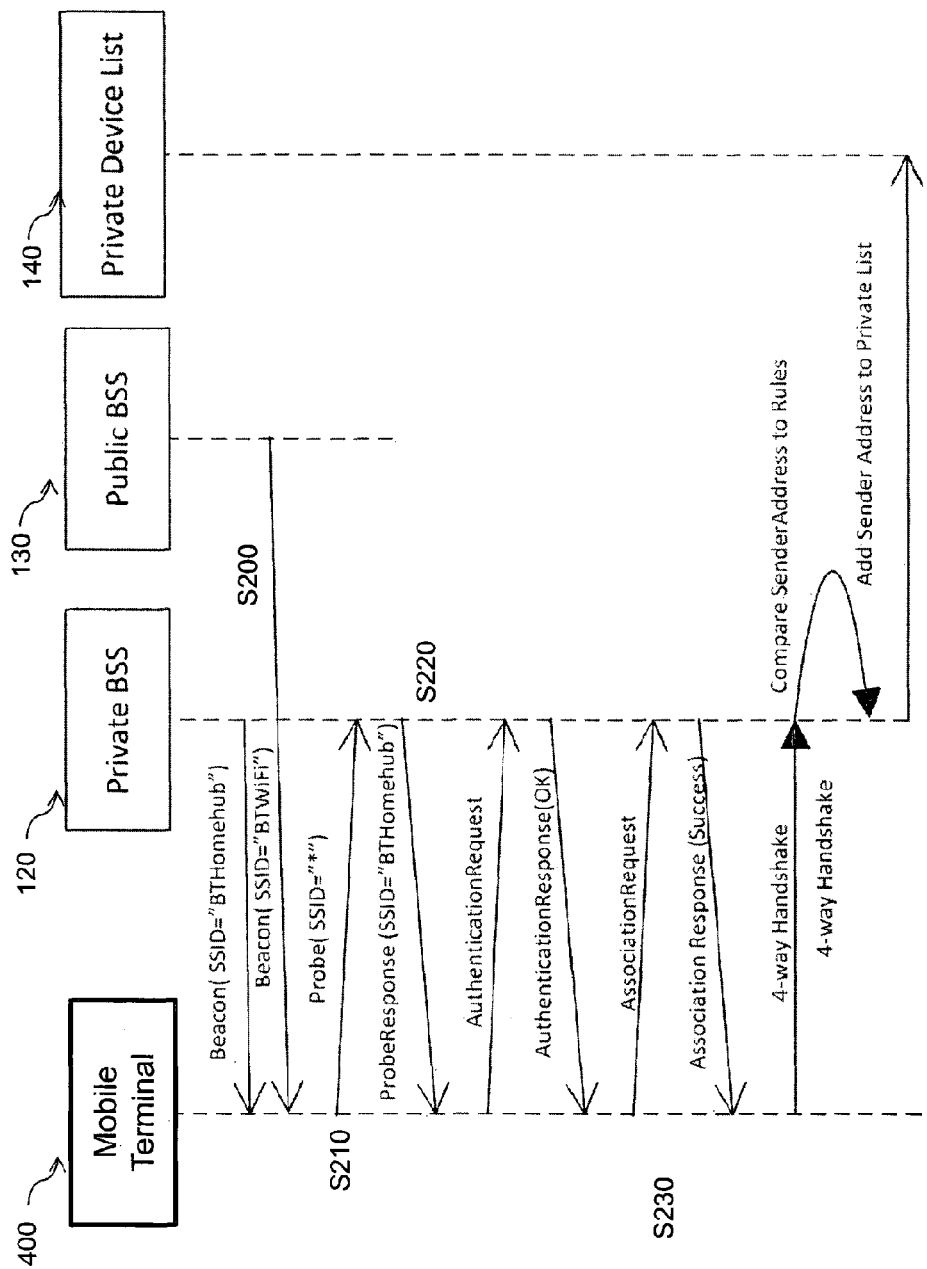
FIG. 2 shows a FIG. 2, which provides a graphical description of how a unique identifier of a mobile terminal is stored within the private device list.

The present invention will now be described in greater detail with reference to FIG. 2, which provides a graphical description of how a unique identifier of a mobile terminal is stored within the private device list. The private and the public BSSs will both transmit respective beacon signals at step S200 which comprise the SSID of each of the BSSs. When a mobile terminal 400 is within range of the wireless access point 100 then it will be able to detect these beacon signals. Initially, the mobile terminal will display to the user both the private and the public BSSs. If the user has the necessary authority to connect to the private BSS then the user may select the private BSS. In response the mobile terminal will transmit a probe signal (S210) to the private BSS which the access point replies with a probe response which comprises the SSID of the private BSS, "BTHomeHub", (S220). A conventional authentication procedure is then initiated (S230), which concludes with a 4-way handshake. After the completion of the 4-way handshake then the wireless access point will store the MAC address of the mobile terminal in the private device list 140.

Figure 3:
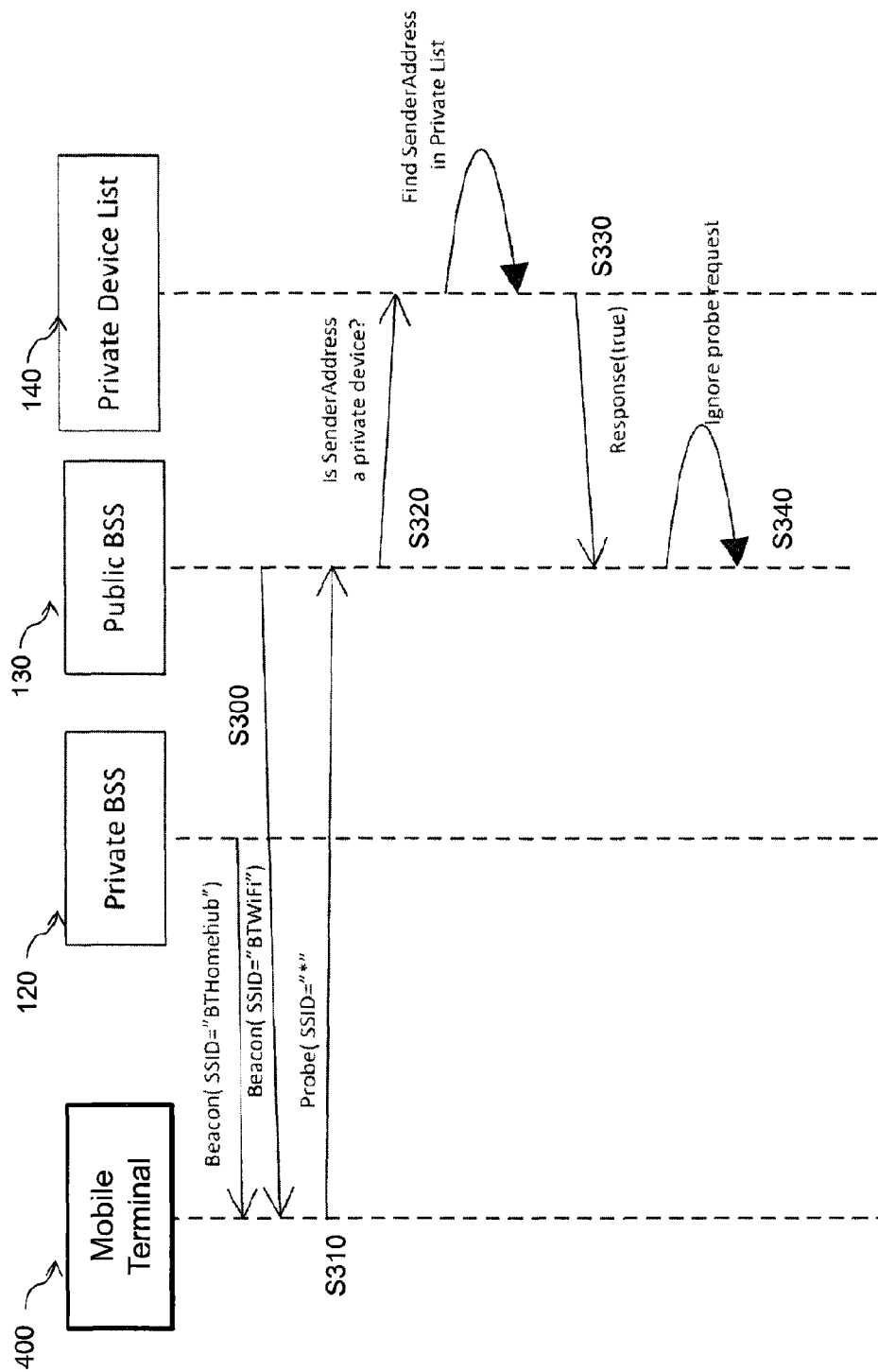
FIG. 3 shows a graphical description of the operation of the wireless action point when a mobile terminal which has previously connected via the private BSS comes into range of the wireless action point.

FIG. 3 shows a graphical description of the operation of the wireless action point 100 when a mobile terminal comes into range of the wireless action point and to which it has previously successfully connected via the private BSS. As described above with reference to FIG. 2, the private and the public BSSs will both transmit respective beacon signals which comprise the SSID of each of the BSSs (step S300).). If the SSID prioritisation algorithm within the mobile terminal decides to select the public BSS then if the mobile terminal responds by transmitting a probe signal to the public BSS (step S310) then the public BSS will interrogate the private device list to determine if the MAC address of the mobile terminal is held (S320) in the private device list. If the response from the private device list (step S330) confirms this fact, then the public BSS will terminate the process at step S340 by ignoring the probe signal. The result of this is that the mobile terminal is not able to connect to the public BSS and will assume that the public BSS is in fact out of range. The public BSSID will not be displayed by the mobile terminal.

If the MAC address of the mobile terminal is not held in the private device list then the wireless access point will respond to the probe signal and subsequent association messages in a conventional manner. If the mobile terminal were already connected to a further WiFi access point then it would retain its connection to this access point and will not attempt to roam to the public BSS so the user will not lose network connectivity.

Figure 4:
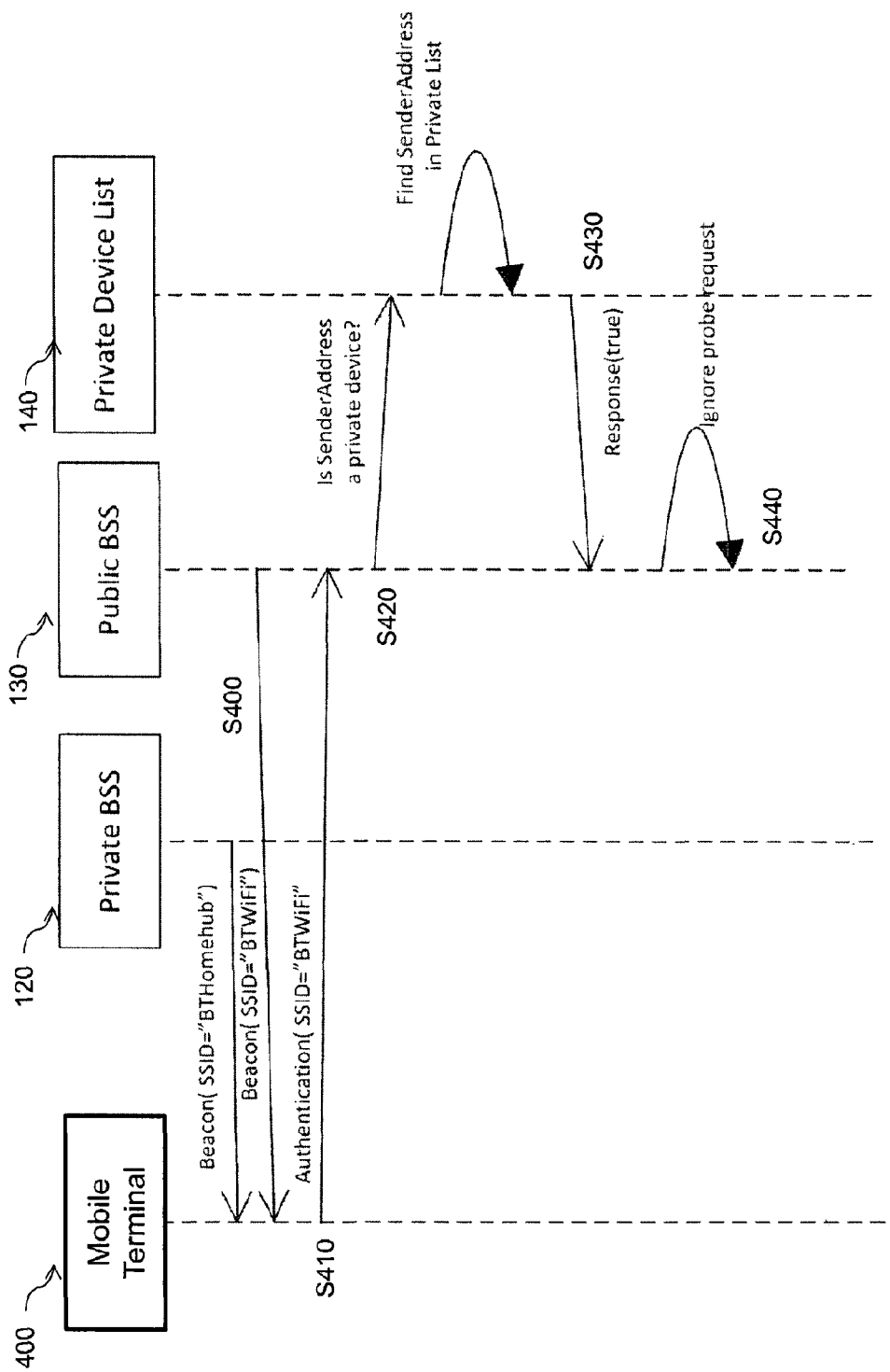
FIG. 4 shows a further graphical description of the operation of the wireless action point when a mobile terminal whose MAC address is stored in the private device list comes into range of the wireless action point.

FIG. 4 shows a further graphical description of the operation of the wireless action point 100 when a mobile terminal whose MAC address is stored in the private device list comes into range of the wireless action point. As described above with reference to FIGS. 2 & 3, the private and the public BSSs will both transmit respective beacon signals which comprise the SSID of each of the BSSs (step S400). If the mobile terminal attempts to authenticate to the public BSS (step S410) then the public BSS will interrogate the private device list to determine if the MAC address of the mobile terminal is held (S420) in the private device list. If the response from the private device list (step S430) confirms this fact, then the public BSS will terminate the process at step S440 by ignoring the authentication request and thus the terminal will not make a connection to the wireless access point. If the MAC address of the mobile terminal is not held in the private device list then the wireless access point will respond to the authentication request in a conventional manner, as is described above with reference to FIG. 2.

As some wireless access points are capable of transmitting simultaneously in the 2.4 GHz and 5 GHz bands, it should be understood that the present invention may use more than one frequency band for both the private BSS and the public BSSs (the invention may be implemented with an access point transmitting more than one public BSSs). Alternatively, private and public BSSs may be segregated across different frequency bands.

Conventionally, access points are capable of being managed by a user, for example by having an interface which may be accessed via a web browser. It may be possible for a user to manage or modify the private device list in such a manner. This allows users to remove devices from the private device list or modify a private-only flag if they want one or more particular devices to be able to connect to both public or private BSS(s).

The access point may also compare the MAC address of a mobile terminal to one or more rules which define whether a device which successfully associated to the private BSS should be added to the private device list. For example, the access point may choose to not add devices of a particular type e.g. where the MAC address of a mobile terminal begins with a particular 3 bytes sequence which indicates a particular device type e.g. 00-0A-95 indicates an Apple device. This allows the behaviour to be made dependent on device type such that this invention may only be applied to devices whose SSID prioritisation algorithm is known to be incorrect. Such rules may be created, chosen or configured by a user via the management interface or by the network operator via a remote management system such as DSLForum standard TR0.69.

Because the invention is implemented within the wireless access point, it will be understood that the invention will work with any form of mobile terminal, without the need for the terminal to be executing any additional software.

As the present invention is implemented on software within a wireless access point, it may be possible to upgrade a conventional wireless access point to one which can perform a method according to the present invention. Computer code may be deployed to a wireless access point via download, for example via the internet from an ISP, or on some physical media, for example, DVD, CD-ROM, USB memory stick, etc. for which the wireless access point has an appropriate media reader.

In summary, the invention provides a wireless access point which comprises a private device list, a private BSS and a public BSS. When a mobile terminal connects to the private BSS a unique identifier (such as a MAC address) is stored in the private device list. Any device whose unique identifier is stored in the private device list is prevented from subsequently connecting to the public BSS.

What is claimed is:

1. A wireless access point comprising: a wireless network interface, a private device list and a connection to one or more communication networks; the wireless access point being configured, in use, to
   i) transmit a first identity and a second identity over the wireless network interface;
   ii) store a unique identifier of a mobile terminal in the private device list in response to the mobile terminal making a connection to the wireless access point via the first identity; and
   iii) subsequently prevent a mobile terminal for which an associated unique identifier is stored in the private device list from connecting to the wireless access point via the second identity.

2. A wireless access point according to claim 1 wherein the wireless access point is configured to store a media access control (MAC) address of the mobile terminal in the private device list in response to the mobile terminal making a connection to the wireless access point via the first identity.

3. A wireless access point according to claim 1, wherein the first identity comprises a private basic service set.

4. A wireless access point according to claim 2, wherein: the wireless access point is further configured, in use, to interrogate the private device list to determine if the MAC address of the mobile terminal is stored in the private device list; and subsequent prevention of the mobile terminal from connecting to the wireless access point via the second identity is performed based on a determination that the MAC address of the mobile terminal is stored in the private device list.

5. A wireless access point according to claim 1, wherein the second identity comprises a public basic service set.

6. A method of operating a wireless access point, the method comprising the steps of:
   a) transmitting a first identity and a second identity via a wireless network interface;
   b) storing a unique identifier of a mobile terminal in a private device list in response to the mobile terminal making a connection to the wireless access point via the first identity; and
   c) subsequently preventing a mobile terminal for which an associated unique identifier is stored in the private device list from connecting to the wireless access point via the second identity.

7. The method according to claim 6, wherein the unique identifier is a media access control (MAC) address of the mobile terminal so that the MAC address of the mobile terminal is stored in the private device list in response to the mobile terminal making the connection to the wireless access point via the first identity.

8. The method according to claim 7, further comprising:
   interrogating the private device list to determine if the MAC address of the mobile terminal is stored in the private device list; and
   subsequently preventing of the mobile terminal from connecting to the wireless access point via the second identity based on a determination that the MAC address of the mobile terminal is stored in the private device list.

9. The method according to claim 6, wherein the first identity identifies a private basic service set.

10. The method according to claim 6, wherein the second identity identifies a public basic service set.

11. A non-transitory tangible storage medium for use in a computing device, the storage medium storing computer executable code which, upon execution by the computing device, performs a method comprising:
    a) transmitting a first identity and a second identity via a wireless network interface;
    b) storing a unique identifier of a mobile terminal in a private device list in response to the mobile terminal making a connection to the wireless access point via the first identity; and
    c) subsequently preventing a mobile terminal for which an associated unique identifier is stored in the private device list from connecting to the wireless access point via the second identity.

12. The non-transitory storage medium according to claim 11, wherein the unique identifier is a media access control (MAC) address of the mobile terminal so that the MAC address of the mobile terminal is stored in the private device list in response to the mobile terminal making the connection to the wireless access point via the first identity.

13. The non-transitory storage medium according to claim 12, wherein the computer executable code, upon execution by the computing device, further performs:
    interrogating the private device list to determine if the MAC address of the mobile terminal is stored in the private device list; and
    subsequently preventing of the mobile terminal from connecting to the wireless access point via the second identity based on a determination that the MAC address of the mobile terminal is stored in the private device list.

14. The non-transitory storage medium according to claim 11, wherein the first identity identifies a private basic service set.

15. The non-transitory storage medium according to claim 11, wherein the second identity identifies a public basic service set.

16. A wireless access point comprising: a wireless network interface, storage memory, and a connection to one or more communication networks; the wireless access point being at least configured to:
 transmit a first identifier and a second identifier over the wireless network interface;
 receive a signal from a mobile terminal that makes a connection to the wireless access point via the first identifier;
 store, in the storage memory, a unique identifier of the mobile terminal that makes the connection to the wireless access point via the first identifier;
 again transmit the first identifier and the second identifier over the wireless network interface;
 receive a signal from the mobile terminal via the second identifier;
 determine if the unique identifier of the mobile terminal is stored in the storage memory after receiving the signal from the mobile terminal via the second identifier; and
 prevent the mobile terminal from connecting to the wireless access point via the second identifier based on a determination that the unique identifier of the mobile terminal is stored in the storage memory.

17. The wireless access point according to claim 16, wherein the unique identifier is a media access control (MAC) address of the mobile terminal.

18. The wireless access point according to claim 16, wherein the first identifier identifies a private basic service set.

19. The wireless access point according to claim 16, wherein the second identifier identifies a public basic service set.

* * * * *